United States Patent [19]

Loughran

[11] Patent Number: 5,110,330
[45] Date of Patent: May 5, 1992

[54] FILTER DRYER

[75] Inventor: James F. Loughran, Hanover Park, Ill.

[73] Assignee: Arrow Pneumatics, Inc., Lake Zurich, Ill.

[21] Appl. No.: 677,594

[22] Filed: Mar. 27, 1991

Related U.S. Application Data

[63] Continuation of Ser. No. 477,241, Feb. 8, 1990, abandoned.

[51] Int. Cl.⁵ .................................. B01D 53/04
[52] U.S. Cl. ........................................ 55/275; 55/316; 55/387; 55/485
[58] Field of Search .............. 55/275, 316, 387, 485, 55/486, DIG. 17; 210/266, 282

[56] References Cited

U.S. PATENT DOCUMENTS

| | | | |
|---|---|---|---|
| 1,839,350 | 1/1932 | Slagel | 55/316 |
| 1,866,659 | 7/1932 | Litle, Jr. | 55/316 X |
| 2,199,258 | 4/1940 | Gray | 55/316 X |
| 2,325,657 | 8/1943 | Burkness | 55/387 X |
| 2,526,782 | 10/1950 | Thorpe | 55/274 |
| 2,526,938 | 10/1950 | Davis et al. | 55/275 X |
| 2,579,053 | 12/1951 | Schulstadt | 55/316 X |
| 2,593,132 | 4/1952 | Gannon | 55/316 X |
| 2,671,526 | 3/1954 | Hunt et al. | 55/275 |
| 2,671,528 | 3/1954 | Gross | 55/316 |
| 2,744,523 | 5/1956 | Malcom, Jr. et al. | 55/316 X |
| 2,845,138 | 7/1958 | Gageby | 55/316 X |
| 2,987,175 | 6/1961 | Bottum | 55/387 X |
| 3,029,581 | 4/1962 | Robbins | 55/316 |
| 3,047,993 | 8/1962 | Robbins | 55/274 |
| 3,090,490 | 5/1963 | Yocum | 55/387 X |
| 3,169,112 | 2/1965 | Nelson | 55/316 X |
| 3,246,758 | 4/1966 | Wagner | 55/387 X |
| 3,358,428 | 12/1967 | Mann | 55/387 |
| 3,464,186 | 2/1969 | Hankinson et al. | 55/163 |
| 3,479,146 | 11/1969 | Hochman et al. | 55/387 X |
| 3,681,899 | 8/1972 | Grote | 55/387 X |
| 3,705,480 | 12/1972 | Wireman | 55/275 |
| 3,941,573 | 3/1976 | Chapel | 55/316 |
| 4,548,624 | 10/1985 | Walker | 55/274 |
| 4,741,697 | 5/1988 | Herbison | 55/387 X |
| 4,770,678 | 9/1988 | Haslett, Jr. | 55/316 X |
| 4,811,571 | 3/1989 | Mayer | 62/474 |

FOREIGN PATENT DOCUMENTS

| | | | |
|---|---|---|---|
| 1100660 | 3/1961 | Fed. Rep. of Germany | 55/196 |
| 1218736 | 1/1971 | United Kingdom | |
| 2078128 | 1/1982 | United Kingdom | 55/387 |

Primary Examiner—Robert Spitzer
Attorney, Agent, or Firm—Trexler, Bushnell, Giangiorgi & Blackstone, Ltd.

[57] ABSTRACT

An air filter dryer for adsorbing moisture from an air flow of the type typically found in a pneumatic power system comprises a housing having an inlet fitting and an outlet fitting arranged such that the filter dryer can be installed directly in line with system piping. The filter dryer also includes a series of filters arranged symmetrically at each end of the housing. Included in the series of filters are dispersion filters which collect moisture in the air flow and also disperse the air evenly across the housing. An oil removal filter is located adjacent each dispersion filter in the filter arrangement, and acts to remove any oil contaminants from the air flow. This filter dryer further includes a silica gel desiccant, located between the respective oil removal filters, which adsorbs moisture from the air stream. The air then passes through the second symmetrically arranged series of filters, and exits through the outlet fitting.

5 Claims, 1 Drawing Sheet

U.S. Patent — May 5, 1992 — 5,110,330
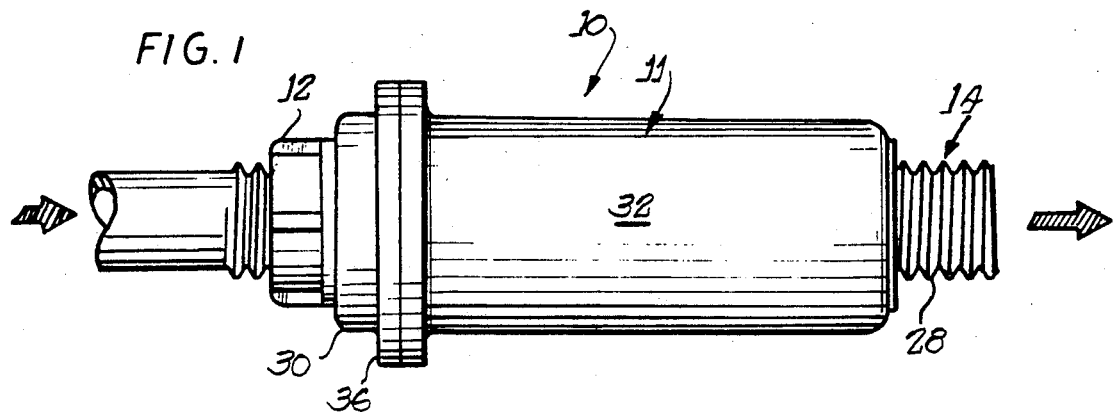
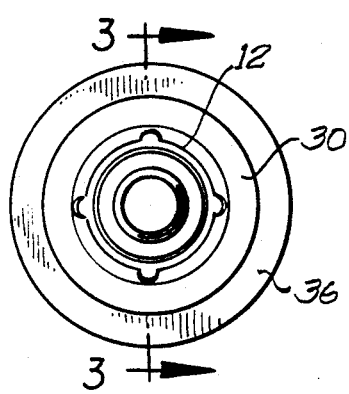
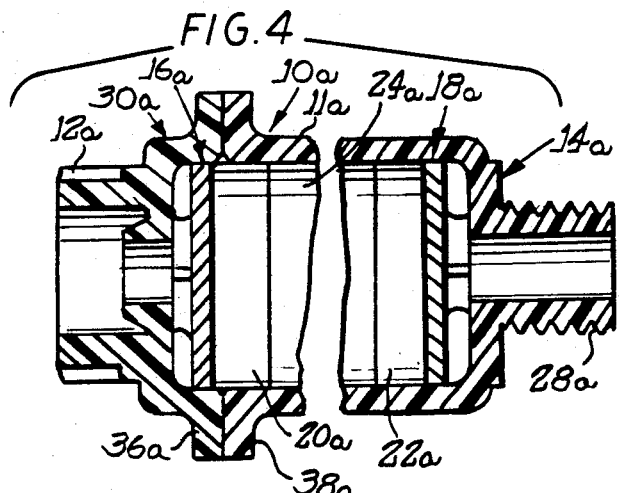
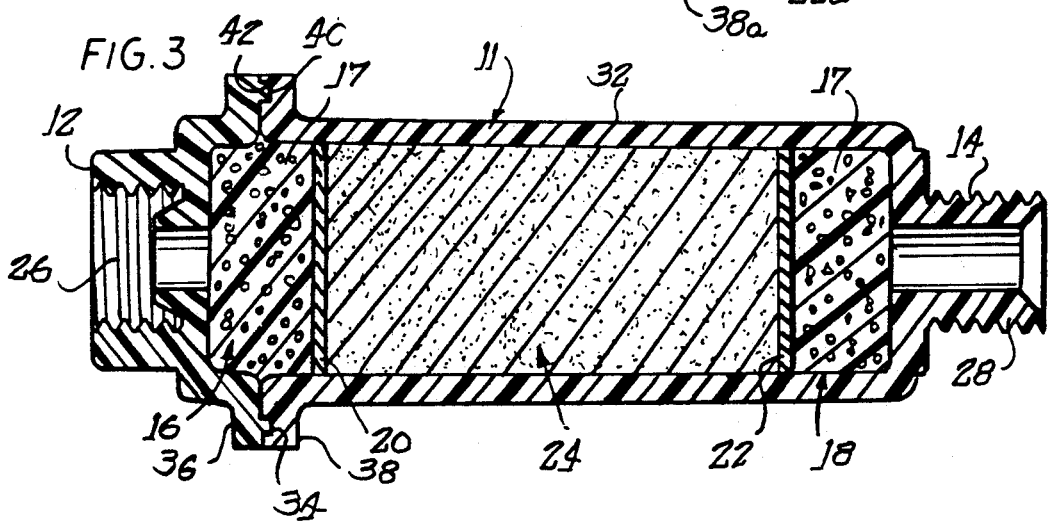

FILTER DRYER

This application is a continuation, now abandoned of application Ser. No. 07/477,241, filed Feb. 8, 1990, now abandoned.

BACKGROUND OF THE INVENTION

The present invention is directed generally to air dryers, and more particularly to an air filter dryer for use in a compressed air systems for filtering oil particles and for removing moisture from a stream of compressed air.

Compressed air systems with which the invention might be utilized may be found in a variety of manufacturing and assembly plants. For example, such systems are used with pneumatically operated tools and pneumatically controlled machines. These tools and machines are subject to substantial impairment in the event of corrosion caused by the presence of moisture in the compressed air system. As a further example, such compressed air systems are used in the operation of sensitive pneumatic instruments and controls, which may be materially adversely affected by excessive moisture in the compressed air stream. In addition to moisture, the compressed air stream may also contain impurities and contaminants such as oil, dust, pipe scale and other particulate matter, which can and do produce harmful results upon condensation of the water vapor.

Numerous forms of air dryers have been proposed and are presently in use. One example is a refrigerated air dryer. In this type of dryer, the hot compressed air is brought into contact with a refrigeration coil to lower air temperature and cause the water vapor to condense. The condensate is then collected in a moisture separator. While this type of air dryer has been found to be quite effective for removing moisture from compressed air, there still remains room for improvement. For example, this type of system requires a two-stage process. First, the air must be cooled, then the vapor produced from cooling the air must be separated. The cooling unit and the moisture separator are usually connected by lengths of tubing, which requires that the compressed air travel some distance to the separator. Consequently, some of the water vapor is often re-evaporated into the cooled air. As a result, at least some of the moisture remains in the air which is utilized by the pneumatically controlled machinery. This, of course, is undesirable.

Another form of filter dryer is the adsorbent type of air dryer which employs a large tank or chamber within which a desiccant is stored. The compressed air is passed through the tank prior to being supplied to the air supply line for the tools or instruments, such that the desiccant adsorbs a considerable amount of vapor. However, the desiccant eventually reaches a saturation point, at which time the filter-dryer is no longer useful. Therefore, the operating and recharging costs of this type of filter are often high.

OBJECTS OF THE INVENTION

It is therefore an object of the present invention to provide a new and improved air dryer system.

It is a more particular object of the present invention to provide an air filter dryer which is highly effective in removing both moisture and contaminants from compressed air to be utilized by pneumatically controlled and operated instruments and/or machinery, and yet is surprisingly economical.

It is still a further object of this invention to provide a new and improved adsorbent type of air filter dryer which is less expensive and easier to operate than presently known types.

Another object of this invention is to provide an improved type of adsorbent air filter which is sufficiently economical to be provided as a disposable unit. Briefly stated, the present invention firstly comprises a housing portion adapted to be inserted in line with system piping and having an inlet for receiving a compressed air flow and an outlet for distributing a pure, unsaturated air back into the system piping. The invention further comprises a series of filters for purifying the compressed air stream.

The filters include a centrally disposed desiccant filter portion which adsorbs any water vapor present in the compressed air stream. The housing is double-ended and oil and particulate filtration means are symmetrically disposed at either end of the desiccant. Thus the filter dryer can be installed to handle air flowing in either direction and the same results will be achieved.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in which like reference numerals identify like elements, and in which:

FIG. 1 is a side elevation of a filter dryer in accordance with the invention;

FIG. 2 is an end view taken from the left end of FIG. 1;

FIG. 3 is a cross-sectional view taken generally along line 3—3 of FIG. 2; and

FIG. 4 is a cross-sectional view similar to FIG. 3, showing a second embodiment.

DESCRIPTION OF THE ILLUSTRATED EMBODIMENT

Referring now to the drawings, and initially to FIG. 1, there is shown a filter dryer 10 having a housing 11, and respective inlet and outlet fittings 12, 14 for directing incoming and outgoing air flow, as indicated by the large arrows in FIG. 1. Both the inlet and outlet fittings 12, 14 are designed so as to make the filter dryer 10 easily installable directly in-line with the piping of a conventional pneumatic air system. Furthermore, the filters (to be described hereinbelow) found inside of the housing 11 are symmetrically disposed with respect to the inlet and the outlet 14. Thus the terms inlet and outlet 14 are interchangeable such that the filter may be used in either direction of air flow.

Since the inlet 12 and outlet 14 of the housing 11 are conventional fittings, installation and removal for replacement of the filter dryer is greatly facilitated.

Inside the housing 11 there is a series of filters which is best viewed in FIG. 3. Immediately after passing through the inlet 12 of the housing 11 the air flow encounters a dispersion filter 16. This filter 16, as shown in FIG. 3, is composed of absorbent sponge material 17. The sponge material 17 collects moisture in the air flow. Moreover, the absorbent material 17 disperses the air flow evenly across the inside of the housing element 11.

Once the air flow passes through the dispersion filter 16, it is evenly dispersed across an oil removal filter 20.

This filter 20, as shown in FIG. 3, is a relatively thin paper wafer or waffle-type filter, and acts to remove any oil contaminants from the air flow. The air flow then reaches a silica gel desiccant 24, which is cobalt-treated and is blue in color. The housing 11, as shown in FIG. 3, is of a clear plastic material; which allows the silica gel desiccant 24 to be seen by the user. The desiccant 24 adsorbs any moisture in the air flow and lowers the dew point of the air, preferably to on the order of 10° F.

In the embodiment of FIG. 3, the air then passes through a second oil removal filter 22 and a second dispersion filter 18. The second oil removal filter 22 and the second dispersion filter 18 insure that desiccant dusting and other particulate will not escape during the life of the filter 10. The air flow will then exit through the outlet fitting 14.

Still referring to FIG. 3, it can be seen that the dispersion filters 16, 18 and the oil removal filters 20, 22 are disposed symmetrically at either end of the filter dryer 10. Moreover, by having the filters organized in this arrangement, the filter dryer can work in either direction of air flow; such that the designations "inlet" and "outlet" are by way of example, only, and can be reversed.

A further aspect of this filter dryer 10 is the easy installation into a pneumatic piping system. The inlet and outlet fittings 12, 14, are provided with standard pipe threads 26, 28 such that installation into a piping system is made easily accessible. Moreover, the assembly procedure of the filter dryer 10 has been greatly simplified to help make the present invention more economical to produce.

The filter dryer housing 11, is made up of two primary parts: a smaller cap-like portion 30, which also defines the inlet fitting 12; and a larger cylinder-like portion 32 which comprises a major portion of an outer shell for the filter assembly and the fitting 14. The two portions 30, 32 are preferably plastic and are fitted together such that a sonic weld 34 is all that is needed to hold the entire assembly together.

This weld 34 is formed in an area where respective radially outwardly directed flanges 36, 38 of the housing portions 30, 32 meet. These radially directed flanges 36, 38 are substantially identical and are preferably provided with mating locking and sealing means, such as a complementary annular raised rib and annular recess 40, 42. Other forms of joining, such as adhesives or the like, might also be used in place of the sonic weld, without departing from the invention.

In accordance with a further aspect of the invention, the housing element 11 is made of a translucent plastic material which allows the silica gel desiccant 24 to be seen by the user. In FIG. 3, the housing is a clear, transparent material. As previously discussed, the silica gel desiccant 24, at the time of installation, is blue in color due to the cobalt treatment it receives. However, as it adsorbs water, and its moisture saturation point is reached, it will turn pink in color. It is at this time that the filter dryer 10 must be replaced.

Referring now to FIG. 4, an alternate embodiment of the structure of FIG. 3 is illustrated. In FIG. 4, the like parts and components are identified by like reference numerals with the suffix a. In the embodiment of FIG. 4, the respective dispersion filters 16a, 18a and oil removal filters 20a, 22a are arranged in the same symmetrical fashion as in the embodiment of FIG. 3. However, in the embodiment of FIG. 4, the compositions of the filters, as well as of the housing 11 are somewhat different from that described above with respect to FIG. 3.

In the embodiment of FIG. 4, the dispersion filters 16a, 18a are preferably formed of a sintered bronze material for yet further improved air distribution across the filter and improved dirt collection. The sintered bronze filter members 16a and 18a will be seen to be somewhat thinner than the sponge material dispersion filters 16, 18 of FIG. 3. On the other hand, the oil removal filters 20a, 22a are somewhat thicker than the paper material illustrated with FIG. 3. The oil removal filters 20a, 22a of FIG. 4 are preferably cotton filter elements, rather than the paper wafer design of the filter elements in the embodiment of FIG. 3. Again, this permits somewhat improved liquid moisture absorption, oil vapor collection and desiccant dust removal.

The desiccant bed 24a in FIG. 4 is of the same material as in FIG. 3. However, in the embodiment of FIG. 4, the housing 11a is preferably formed of a tinted translucent plastic material, preferably of a highly chemically resistant, high strength plastic available from General Electric under the tradename "ULTEM". This material is translucent with an off-brown tint. Accordingly, the desiccant appearance through this material is generally dark or black when dry and generally transparent when the total water absorption is complete.

While the invention has been illustrated and described hereinabove with reference to the preferred embodiment, the invention is not limited thereto. Those skilled in the art may devise alternatives, changes and modifications upon reading the foregoing description. Accordingly, the invention includes such alternatives, changes and modifications, insofar as they fall within the spirit and scope of the appended claims.

The invention is claimed as follows:

1. An in-line filter dryer for filtering contaminants from and drying a flow of compressed air, comprising: a housing having an entrance and an exit, each defining a first cross-sectional area and an interior volume defining a second cross-sectional area much greater than said first cross-sectional area; a sintered bronze dispersion filter element mounted within said housing intermediate said entrance and said interior volume for collecting liquid material and dirt in an entering air flow and for dispersing air form said entrance evenly across said interior volume; a cotton oil removal filter element mounted within said housing for receiving air from said dispersion filter and removing oil contaminants from the air; a quantity of desiccant contained within said interior volume of said housing for receiving air from said oil removal filter for adsorbing the moisture and lowering the dewpoint of the air; a second cotton oil removal filter element and a second sintered bronze dispersion filter element, arranged in the housing in a substantially symmetrical manner with the first oil removal and dispersion filters, for filtering out desiccant dust and other particles form the air exiting said housing and for allowing the filter dryer to be used in either direction of air flow.

2. A filter dryer according to claim 1 in which the desiccant is a cobalt treated silica gel.

3. A filter dryer according to claim 1 wherein said housing is formed of a translucent material and wherein said desiccant comprises a material which exhibits a first coloration prior to adsorbtion of water thereby, and a second coloration as it adsorbs water, such that a change from said first coloration to said second coloration is observable through said translucent material of said housing.

4. A filter dryer according to claim 1 wherein said translucent material comprises a highly chemically-resistant high strength polyetherimide material having an off-brown tint such that said desiccant appears generally dark when dry and generally transparent when total water absorption is complete.

5. A filter dryer according to claim 4 wherein said desiccant comprises a cobalt treated silica gel.

* * * * *